(12) United States Patent
Lee et al.

(10) Patent No.: US 7,850,937 B2
(45) Date of Patent: Dec. 14, 2010

(54) CATALYTIC SYSTEM FOR REMOVING CARBON MONOXIDE, AND PROCESSOR AND FUEL CELL SYSTEM USING THE SAME

(75) Inventors: Hyun-chul Lee, Yongin-si (KR); Soon-ho Kim, Seoul (KR); Yulia Potapova, Yongin-si (KR); Eun-duck Park, Incheon-si (KR); Eun-yong Ko, Jeju-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 893 days.

(21) Appl. No.: 11/333,372

(22) Filed: Jan. 18, 2006

(65) Prior Publication Data

US 2006/0165576 A1      Jul. 27, 2006

(30) Foreign Application Priority Data

Jan. 25, 2005    (KR) ................. 10-2005-0006578

(51) Int. Cl.
*C01B 31/18* (2006.01)
(52) U.S. Cl. ............... 423/247; 423/246; 422/168; 422/177; 422/180
(58) Field of Classification Search ......... 423/246; 422/168, 177, 180
See application file for complete search history.

(56) References Cited

U.S. PATENT DOCUMENTS

| | | | | |
|---|---|---|---|---|
| 2,400,922 A | * | 5/1946 | Evering et al. | 585/255 |
| 3,544,642 A | * | 12/1970 | Dahlberg et al. | 570/235 |
| 4,912,271 A | * | 3/1990 | Thelen et al. | 570/233 |
| 6,015,769 A | * | 1/2000 | Wang | 502/331 |
| 6,787,118 B2 | * | 9/2004 | Roark et al. | 423/247 |
| 2003/0162656 A1 | * | 8/2003 | Wu et al. | 502/325 |
| 2005/0095189 A1 | * | 5/2005 | Brey et al. | 423/427 |

FOREIGN PATENT DOCUMENTS

| | | |
|---|---|---|
| JP | 63-252908 | 10/1988 |
| JP | 10-085588 | 4/1998 |
| JP | 2004-188243 | 7/2004 |
| JP | 2004-230368 | 8/2004 |
| JP | 2004-293985 | 10/2004 |
| JP | 2006-120626 | 5/2006 |
| JP | 2007-506548 | 3/2007 |
| WO | WO 2005/120686 A1 | 12/2005 |

OTHER PUBLICATIONS

Kim, W.B., et al., "Powering fuel cells with CO via aqueous polyoxometalates and gold catalysts," *Science* 305, 2004, pp. 1280-1283.
Office Action issued by the Japanese Patent Office in Japanese Patent Application No. 2006-16928 on Nov. 17, 2008.

* cited by examiner

*Primary Examiner*—Timothy Vanoy
*Assistant Examiner*—Michelle Hou
(74) *Attorney, Agent, or Firm*—Lee & Morse, P.C.

(57) ABSTRACT

A catalytic system for CO removal includes a gold (Au) catalyst and a co-catalyst in contact with an aqueous phase, and a fuel cell system using the same. The catalytic system is relatively very simple compared to a common CO removal system, and can highly efficiently remove CO at low temperature without side reaction. In addition, water contacted in the catalytic system can act as a buffer for the rise and fall of temperature, and thus, can cope with an accidental temperature change. Further, the catalytic system shows a low operation temperature, and thus, can be operated over a broad operation range considering the activity and/or selectivity of the gold catalyst, etc.

14 Claims, 4 Drawing Sheets

CATALYTIC SYSTEM FOR REMOVING CARBON MONOXIDE, AND PROCESSOR AND FUEL CELL SYSTEM USING THE SAME

CROSS-REFERENCE TO RELATED APPLICATIONS

This application claims priority from Korean Patent Application No. 2005-6578, filed on Jan. 25, 2005, in the Korean Intellectual Property Office, the disclosure of which is incorporated herein in its entirety by reference.

BACKGROUND OF THE INVENTION

1. Field of the Invention

Aspects of the present invention relate to a catalytic system for removing carbon monoxide (CO), and more particularly, to a low-temperature, cost-effective, high-efficiency catalytic system for removal of CO in reformed fuel for use in fuel cells.

2. Description of the Related Art

Fuel cells are electricity generation systems that directly convert the chemical energy of oxygen, and hydrogen in hydrocarbons, such as methanol, ethanol, and natural gas, to electrical energy.

Fuel cell systems typically include a fuel cell stack, a fuel processor (FP), a fuel tank, and a fuel pump. The fuel cell stack is the main body of the fuel cell, and is a stack of a plurality (several to several tens) of unit cells, each including a membrane electrode assembly (MEA) and a separator (or bipolar plate).

The fuel pump supplies fuel from the fuel tank to the fuel processor. The fuel processor produces hydrogen by reforming and purifying the fuel and supplies the hydrogen to the fuel cell stack. The fuel cell stack receives the hydrogen and generates electrical energy by electrochemical reaction of the hydrogen with oxygen.

A reformer of the fuel processor reforms hydrocarbon fuel using a reforming catalyst. A hydrocarbon fuel typically contains sulfur compounds. Since the reforming catalyst is easily poisoned by sulfur compounds, it is necessary to remove the sulfur compounds prior to reforming hydrocarbon fuel. Thus, hydrocarbon fuel is subjected to desulfurization prior to a reforming process (see FIG. 1).

Hydrocarbon reforming produces carbon dioxide ($CO_2$) and a small quantity of carbon monoxide (CO), together with hydrogen. Since CO acts as a catalyst poison in electrodes of the fuel cell stack, reformed fuel cannot be directly supplied to the fuel cell stack. Thus, a CO removal process is needed. At this time, it is preferable to reduce the CO levels to less than 10 ppm.

CO can be removed by the high-temperature shift reaction represented by Reaction Scheme 1 below:

$$CO+H_2O \rightarrow CO_2+H_2 \qquad \text{<Reaction Scheme 1>}$$

The high-temperature shift reaction is performed at a high temperature of 400 to 500° C. Thus, the high-temperature shift reaction requires much additional equipment and is inefficient in energy utilization. Furthermore, there arises a serious problem in that a methanation reaction occurs between CO to be removed and reformed hydrogen, as represented by Reaction Scheme 2 below:

$$CO+3H_2 \rightarrow CH_4+H_2O \qquad \text{<Reaction Scheme 2>}$$

The high-temperature shift reaction can be followed by a low-temperature shift reaction at a temperature of 200 to 300° C. However, even after performing both of these reactions, it is very difficult to reduce the CO levels to less than 5,000 ppm.

To solve this problem, a preferential oxidation reaction (so-called "PROX" reaction) represented by Reaction Scheme 3 below can be used:

$$CO+\tfrac{1}{2}O_2 \rightarrow CO_2 \qquad \text{<Reaction Scheme 3>}$$

However, the PROX reaction has the disadvantages that the reaction rate is too slow at low temperatures, and that a reverse water gas shift reaction occurs at high temperatures.

In addition, the above-described reactions act as rate-limiting steps of the overall reaction in a fuel cell system due to the slow reaction rate, and require a large quantity of water and thus much additional equipment, which makes it difficult to use a fuel cell as a power source when compactness and mobility are desired, such as in automobiles, etc.

Meanwhile, in view of the above problems, an attempt has been made to remove CO in fuel using a gold (Au) catalyst and polyoxometalate (Kim, W. B., et al., "Powering fuel cells with CO via aqueous polyoxometalates and gold catalysts," *Science* 305, 2004, pp. 1280-1283).

In this catalytic system, CO is converted to $CO_2$ and polyoxometalate is reduced by a contact reaction of liquid water with CO over a gold nanotube catalyst. The reduced polyoxometalate is reoxidized in an anode of a fuel cell. The reoxidized polyoxometalate is recycled, and electrons produced during the oxidation of CO travel to an external load.

This catalytic system has an advantage that electricity is directly generated by direct supply of the electrons produced during the oxidation of CO to the external load. However, there are disadvantages in that the catalytic system is structurally complicated by the recycling system, the preparation of the gold nanotube catalyst using no support increases catalyst costs, and a water supply to a fuel processor is separately required.

Therefore, it is necessary to develop a simple, low-cost, high-efficiency fuel processor that offers a simple system construction and low catalyst costs, and does not require a separate water supply.

SUMMARY OF THE INVENTION

An aspect of the present invention provides a cost-effective, high-efficiency catalytic system for removing CO in a fuel gas at low temperature.

Another aspect of the present invention provides a fuel processor using the catalytic system for CO removal.

Another aspect of the present invention provides a fuel cell system using the catalytic system for CO removal.

According to an aspect of the present invention, there is provided a catalytic system for CO removal, wherein a gold (Au) catalyst and a co-catalyst are contained in or in contact with an aqueous phase.

The co-catalyst may be a copper (Cu)-based compound with a redox potential, an iron (Fe)-based compound with a redox potential, a vanadium (V)-based compound with a redox potential, a heteropolyacid, or a mixture thereof.

The catalytic system for CO removal can efficiently remove CO in a fuel gas at a low temperature of 90° C. or less, and is hardly affected by an accidental temperature change that may be caused by exothermic oxidation of CO.

According to another aspect of the present invention, there is provided a method of removing CO from a CO-containing fluid by providing a catalytic system comprising a gold (Au) catalyst and a co-catalyst contained in or in contact with an aqueous phase and diffusing the CO-containing fluid into the aqueous phase.

According to another aspect of the present invention, there is provided a fuel processor, which may include a reformer and desulfurizer and which includes the catalytic system for CO removal.

According to still another aspect of the present invention, there is provided a fuel cell system, which may include at least a fuel cell stack and that includes the catalytic system for CO removal.

The catalytic system for CO removal is very simple relative to a conventional CO removal system, and thus a fuel cell system using the catalytic system provides less trouble and lower costs.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
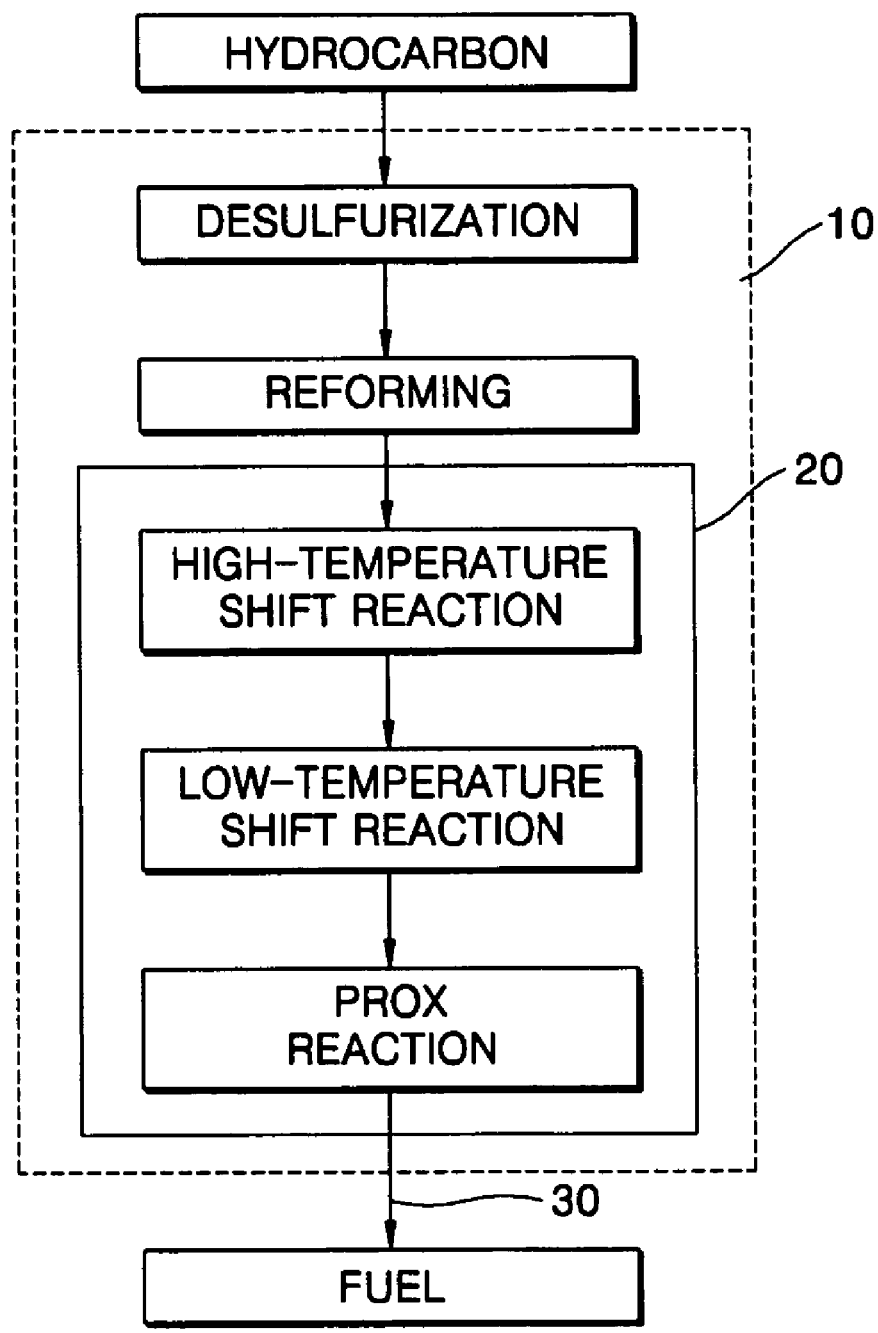
FIG. 1 is a schematic flow diagram illustrating fuel processing in a fuel processor used in a conventional fuel cell system.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

In a catalytic system for carbon monoxide (CO) removal of the present invention, from the point of microscopic view, all oxidation and reduction reactions necessary for CO oxidation occur on a surface of a gold catalyst and in an aqueous phase. From the point of macroscopic view, the catalytic system has a simple construction since only reformed fuel is supplied to the catalytic system, and an external water supply and recycling are not needed.

The catalytic system for CO removal of the present invention includes a gold catalyst and a co-catalyst contained in or in contact with an aqueous phase. As an example, the gold catalyst may be used in an amount of 0.3 to 5 wt % based on the weight of a support used, and the co-catalyst undergoing oxidation-reduction reactions may have an amount of 0.3 to 10 wt % based on the weight of the catalytic system. If the content of the gold catalyst is less than 0.3 wt %, a desired reaction may not occur due to low catalyst activity. On the other hand, the use of the gold catalyst greater than 5 wt % is economically undesirable. If the amount of the co-catalyst is less than 0.3 wt %, a desired reaction may not occur due to low catalyst activity. On the other hand, the use of the co-catalyst greater than 10 wt % is economically undesirable.

A method of the present invention includes diffusing a CO-containing fluid, such as a reformed fuel, into the aqueous phase of the catalytic system. The aqueous CO is removed in the form of $CO_2$ through the catalytic reaction over a surface of a solid gold catalyst, as represented by Reaction Scheme 4 below (see FIG. 2):

　　　　　　　　＜Reaction Scheme 4＞

Aqueous $CO_2$ produced by Reaction Scheme 4 diffuses into the gas phase, and then enters into a fuel cell stack, together with the fuel. Protons produced by Reaction Scheme 4 react with oxygen, which has been supplied together with the fuel gas and then has diffused into the aqueous phase, and a co-catalyst M present in an ionic form, to thereby produce liquid water, as represented by Reaction Scheme 5 below:

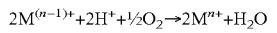　　　　　　　　＜Reaction Scheme 5＞

The co-catalyst M has an oxidation number (n) of 1 to 7. At this time, any other catalyst for assisting the oxidation of the co-catalyst may also be used.

The liquid water produced by Reaction Scheme 5 again participates in the reaction represented by Reaction Scheme 4. Some of the produced liquid water evaporates. However, since the same amount of water vapor is condensed into liquid water, overall kinetic equilibration is achieved. Thus, the total amount of liquid water is maintained at a nearly constant level. Therefore, an external water supply is not needed. Even when the amount of evaporated water is greater than the amount of produced water, only the difference between the two needs to be supplemented by an external water supply.

The co-catalyst $2M^{n+}$ produced by the oxidation of $2M^{(n-1)+}$ in Reaction Scheme 5 is reduced by electrons produced by Reaction Scheme 4 as represented by Reaction Scheme 6 below:

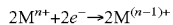　　　　　　　　＜Reaction Scheme 6＞

Figure 2:
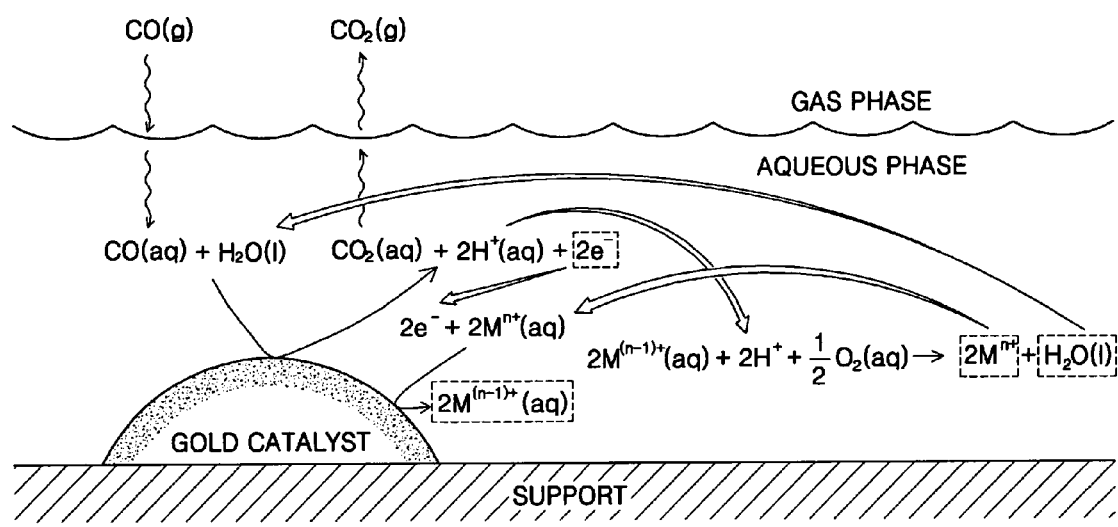
FIG. 2 is a diagram illustrating water-based oxidation-reduction reactions over a gold catalyst of a catalytic system for CO removal according to an aspect of the present invention.

The reactions represented by Reaction Schemes 4 through 6 are summarized in FIG. 2. As shown in FIG. 2, the catalytic system for CO removal of the present invention is a system where the CO removal reaction (Reaction Scheme 4), oxidation reaction (Reaction Scheme 5), and reduction reaction (Reaction Scheme 6) take place at the same time.

That is, as described above, in the catalytic system for CO removal of the present invention, CO removal is performed at a low temperature of 100° C. or less by converting CO diffused into an aqueous phase to $CO_2$ through the reaction of CO with liquid water in the presence of the gold catalyst and the co-catalyst contained in the aqueous phase. The protons produced during the conversion of CO to $CO_2$ react with oxygen derived from an external source to produce liquid water.

Figure 3:
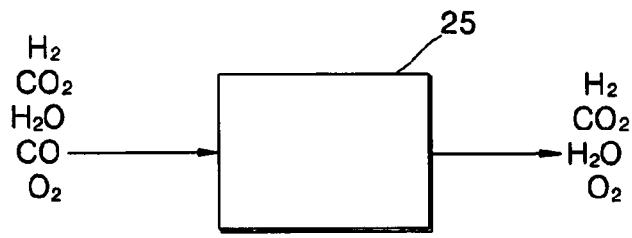
FIG. 3 is a diagram illustrating fluid components in the inlet and outlet of a catalytic system for CO removal according to an aspect of the present invention.

A catalytic system 25 for CO removal according to an aspect of the present invention is illustrated in FIG. 3. A reformed fuel gas contains hydrogen ($H_2$), CO, water ($H_2O$), and $CO_2$. The reformed fuel gas, together with external oxygen, is supplied to the catalytic system 25 for CO removal. Since CO is removed in the form of $CO_2$, outlet fluid components include $H_2$, $CO_2$, $H_2O$, and $O_2$.

The gold catalyst may be loaded on a support.

As an example, the support may be a carbon carrier. The support may also be inorganic microparticles such as alumina, silica, zeolite, $TiO_2$, $ZrO_2$, $CeO_2$, $Fe_2O_3$, etc. Examples of the carbon carrier include, but are not limited to, carbon powder, graphite, fullerene ($C_{60}$), carbon black, acetylene black, activated carbon, carbon nanotube, carbon nanofiber, carbon nanowire, carbon nanohorn, ordered mesoporous carbon and carbon nanoring.

It is preferable that the aqueous phase is formed to a thickness such that the gold catalyst loaded on the support is immersed in the aqueous phase. Thus, a hydrophilic support is preferable.

The loading of the gold catalyst on the support can be performed by various methods known in the art, such as deposition precipitation, coprecipitation, impregnation, sputtering, gas-phase grafting, liquid-phase grafting, or incipient-wetness impregnation. Deposition precipitation is particularly preferable.

An example of deposition precipitation is as follows. A predetermined amount of a gold (Au) precursor is dissolved in water. Separately, a support is dispersed in water. A small quantity of the gold precursor-containing aqueous solution is added to the support-containing dispersion solution. Then, the resultant solution is adjusted to a desired pH by dropwise addition of NaOH separately prepared for pH adjustment. The addition of the gold precursor-containing aqueous solution and the pH adjustment are repeated, followed by filtration, drying, and final oxidation-reduction under air/$H_2$ atmosphere, to prepare a support-loaded gold catalyst.

The support-loaded gold catalyst thus prepared may have a particle size of 2 to 10 nm. It is preferable that the gold catalyst has a smaller particle size. However, it is difficult to prepare a gold catalyst with a particle size less than 2 nm. On the other hand, if the particle size of the gold catalyst exceeds 10 nm, catalyst efficiency may be lowered due to small specific surface area.

The co-catalyst used in the catalytic system for CO removal of the present invention may be a copper (Cu)-based compound with a redox potential, an iron (Fe)-based compound with a redox potential, a vanadium (V)-based compound with a redox potential, a heteropolyacid, or a mixture thereof.

As used herein, the provision that the co-catalyst is a "compound with a redox potential" means that the co-catalyst is capable of being oxidized in the catalytic system according to Reaction Scheme 5, above, and that the oxidized co-catalyst is then capable of being reduced to its original state according to Reaction Scheme 6.

As non-limiting examples, the copper-based compound may be $CuCl_2$, the iron-based compound may be $FeCl_3$, and the vanadium-based compound may be $V_2O_5$. The heteropolyacid may be at least one selected from the group consisting of $H_3PMo_{12}O_{40}$, $H_4PVMo_{11}O_{40}$, $H_5PV_2Mo_{10}O_{40}$, $H_6PV_3Mo_9O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PW_{12}O_{40}$, $H_4PVW_{11}O_{40}$, $H_5PV_2W_{10}O_{40}$, and $H_6PV_3W_9O_{40}$. In particular, a vanadium-containing heteropolyacid has excellent activity.

The co-catalyst may be impregnated on the catalyst in a predetermined amount. For example, the co-catalyst may be uniformly dispersed onto a surface of the above-prepared support-loaded gold catalyst.

The catalytic system for CO removal of the present invention can be embodied as follows. A support-loaded gold catalyst is impregnated with the co-catalyst and is pelletized, and the pellets are placed in a reactor.

The gold catalyst may be applied to any one of various reactors known in the art, such as a batch reactor, a mixed flow reactor, or a plug flow reactor, but the present invention is not limited to the above-illustrated examples. However, it is preferable to use a plug flow reactor packed with a fixed-bed column which can be easily manufactured, installed, and operated, and has a simple structure.

If the diffusion of gaseous CO into an aqueous phase acts as a rate-limiting step of the overall reaction due to a slow diffusion rate, the efficiency of a fuel processor may be lowered. Thus, it is preferable to construct the catalytic system to enable a sufficient diffusion of CO into the aqueous phase in a short time. The diffusion rate of CO into the aqueous phase can be increased by increasing pressure, reducing a space velocity to secure a sufficient contact time, or increasing a contact area using a narrow and long reactor, but the present invention is not limited thereto.

An appropriate operation temperature for the catalytic system for CO removal depends on the activation energy of the reaction over the gold catalyst and the co-catalyst; the concentration of CO and $CO_2$ and the diffusion coefficient of CO and $CO_2$ in the aqueous phase; the change in enthalpy of the reactions represented by Reaction Schemes 4 through 6; etc. In this regard, the operation temperature for the catalytic system may range from 15 to 95° C., more preferably from 50 to 85° C., and still more preferably from 60 to 80° C. If the operation temperature for the catalytic system is too low, reaction activity may be excessively lowered. On the other hand, if the operation temperature for the catalytic system is too high, oxidation-reduction reaction may not occur due to water evaporation.

An appropriate operation pressure for the catalytic system for CO removal of the present invention may range from 0.1 to 3 atm but the present invention is not limited thereto. However, it is more preferable to operate the catalytic system for CO removal of the present invention under an atmospheric pressure.

The space velocity of a fuel gas supplied to the catalytic system for CO removal of the present invention may range from 4,000 to 220,000 $hr^{-1}$. If the space velocity of the fuel gas is less than 4,000 $hr^{-1}$, a large amount of a catalyst is needed, which is cost-ineffective. On the other hand, if it exceeds 220,000 $hr^{-1}$, CO may not be sufficiently removed.

Hereinafter, a fuel processor according to an aspect of the present invention will be described.

The fuel processor according to an aspect of the present invention includes a desulfurizer, a reformer, and a CO removal unit. The desulfurizer may be positioned at the front side of the reformer since a reforming catalyst may be poisoned by a sulfur compound contained in a fuel gas feedstock. The CO removal unit may be positioned at the rear side of the reformer to remove CO which is a byproduct contained in the reformed fuel gas. Thus, the fuel processor may be structured such that the desulfurizer, the reformer, and the CO removal unit are sequentially disposed.

The CO removal unit includes the above-described catalytic system for CO. The catalytic system for CO removal may be in the form of a fixed-bed column packed with the aqueous phase containing the co-catalyst and the gold catalyst.

Hereinafter, a fuel cell system according to the present invention will be described.

The fuel cell system according to an aspect of the present invention may include a fuel source, the catalytic system for removing CO, and at least one fuel cell. The fuel cell system according to an aspect of the present invention may include a fuel cell stack, a fuel tank, a fuel pump, and the fuel processor that includes the catalytic system for removing CO, as described above.

The fuel tank and the fuel pump may be selected from those commonly known in the art provided that they have durability and safety to withstand the pressure of a fuel gas within a temperature range at which the fuel cell system is operated.

The fuel cell stack may be a type that is known in the art, such as phosphoric acid type, molten carbonate type, solid oxide type, polymer electrolyte membrane type, or alkali type.

The fuel processor receives a fuel gas from the fuel tank by the fuel pump and converts the fuel gas to a hydrogen-containing stream.

Hereinafter, the construction and acting effects of the present invention will be described more specifically with reference to the following Examples, Comparative Examples, and Experimental Examples. The following examples are for illustrative purposes and are not intended to limit the scope of the invention.

EXAMPLE 1

A commercially available $Au/Fe_2O_3/\gamma-Al_2O_3$ catalyst (manufactured by Catalysts & Chemicals Inc. Far East— AUS, gold content: 0.35 wt %) was impregnated with commercially available heteropolyacid, $H_6PV_3Mo_9O_{40}$ (available from Nippon Inorganic Color & Chemical Co.) and then dried at 110° C. for 16 hours in a conventional oven.

COMPARATIVE EXAMPLE 1

The commercially available $Au/Fe_2O_3/\gamma-Al_2O_3$ catalyst of Example 1 was used in the absence of a heteropolyacid.

EXPERIMENTAL EXAMPLE 1

Figure 4:
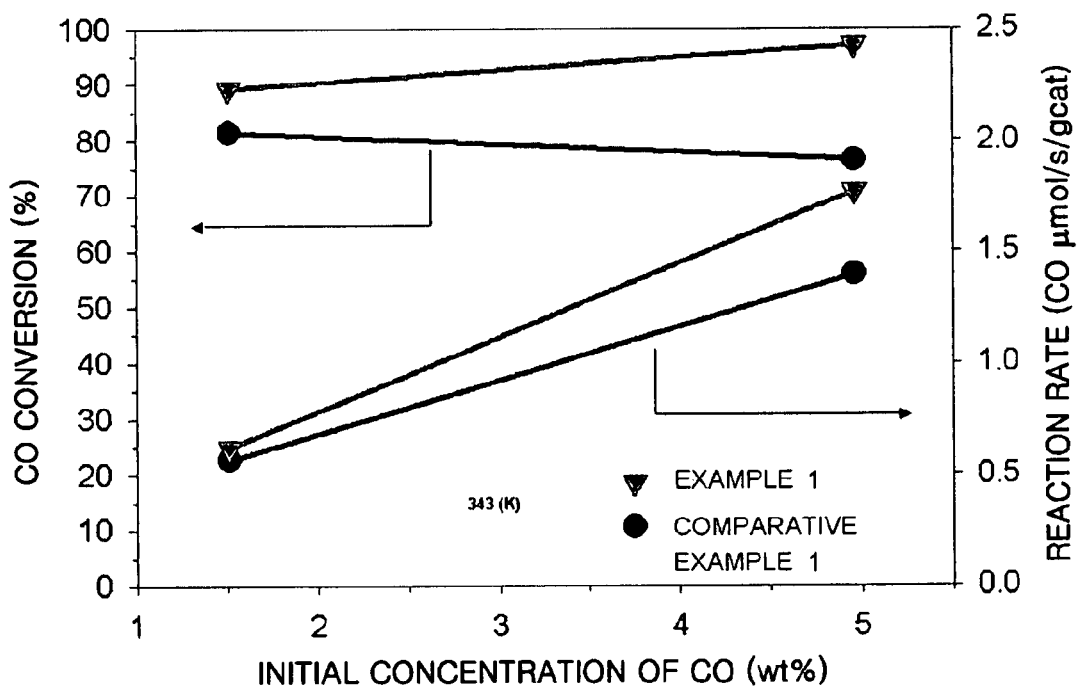
FIG. 4 is a graph illustrating the results of CO removal tests using catalysts of Example 1 and Comparative Example 1.

CO removal tests were performed using the catalysts of Example 1 and Comparative Example 1, and the results are shown in FIG. 4. For this, the CO removal test for a feed gas containing $H_2$ (80 vol %), $O_2$ (1.5 vol %), CO (1.5 vol %), and $CO_2$ (the balance) was performed at 343K (70° C.). At this time, liquid water (the molar ratio of $H_2O/CO$ was 20) was supplied together with the feed gas. As a result, the CO conversion (%) for the catalyst of Example 1 was 10% higher than that for the catalyst of Comparative Example 1, and the reaction rate for the catalyst of Example 1 was slightly higher than that for the catalyst of Comparative Example 1.

The same test as above was performed at the same temperature using a feed gas containing $H_2$ (80 vol %), $O_2$ (5.0 vol %), CO (5.0 vol %), and $CO_2$ (the balance). At this time, liquid water (the molar ratio of $H_2O/CO$ was 6) was supplied together with the feed gas. As a result, the CO conversion (%) for the catalyst of Example 1 was 20% higher than that for the catalyst of Comparative Example 1, and the reaction rate for the catalyst of Example 1 was remarkably higher than that for the catalyst of Comparative Example 1.

EXPERIMENTAL EXAMPLES 2-4

Figure 5:
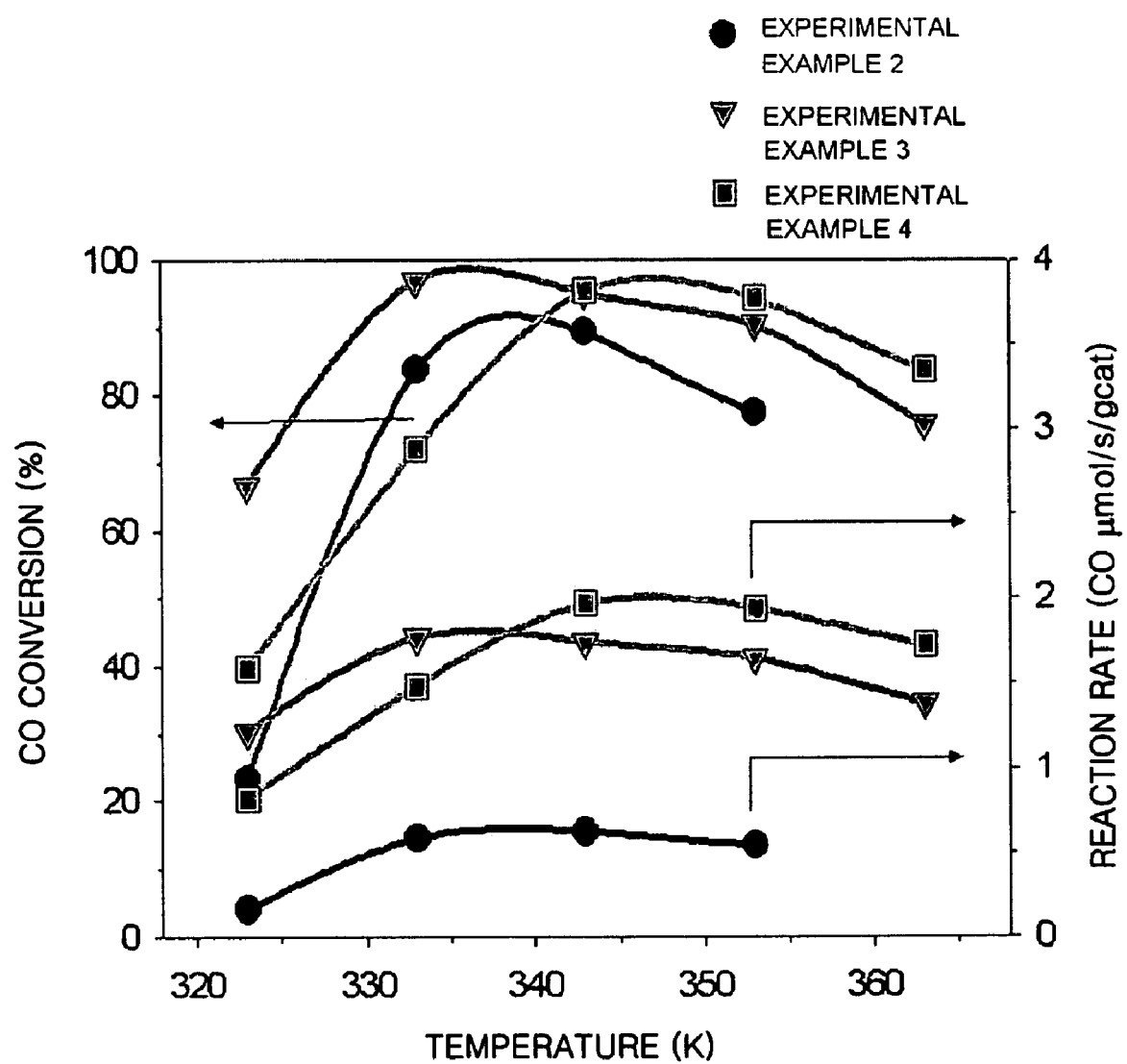
FIG. 5 is a graph illustrating the results of CO removal tests with respect to temperature using the catalyst of Example 2.

CO removal tests were performed using the catalyst of Example 1 with varying temperature, and the results are shown in FIG. 5. The CO removal tests were performed in the same manner as in Experimental Example 1, and test conditions are summarized in Table 1 below.

TABLE 1

| | $H_2$ | CO | $O_2$ | $CO_2$ | Molar ratio of $H_2O/CO$ |
|---|---|---|---|---|---|
| Experimental Example 2 | 80 | 1.5 | 1.5 | Balance | 20 |
| Experimental Example 3 | 80 | 5 | 5 | Balance | 6 |
| Experimental Example 4 | 80 | 5 | 5 | Balance | 10 |

As shown in FIG. 5, the CO conversion and the reaction rate were most excellent at a temperature range from 333K (60° C.) to 353K (80° C.).

The catalytic system for CO removal according to aspects of the present invention is relatively very simple compared to a conventional CO removal system wherein a high-temperature shift reaction, a low-temperature shift reaction, and a PROX reaction are sequentially performed, and water supply is continuously required, and can highly efficiently remove CO at low temperature without side reaction.

In addition, water contacted in the catalytic system according to aspects of the present invention can act as a buffer for the rise and fall of temperature, and thus, can cope with an accidental temperature change. Further, the catalytic system of the present invention shows a low operation temperature, and thus, can be operated over a broad operation range considering the activity and/or selectivity of the gold catalyst, etc.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A catalytic system for removing carbon monoxide (CO) comprising:
   a reactor containing:
      liquid water containing dissolved CO, the liquid water providing an aqueous phase;
      a gold (Au) catalyst loaded on a support and in contact with the aqueous phase, the gold catalyst having a particle size of 2 to 10 nm; and
      a co-catalyst in an amount ranging from 0.3 wt % to 10 wt % based on the combined weight of the gold catalyst, support and co-catalyst, wherein the co-catalyst is in the aqueous phase; and
   an inlet that directs a fluid containing CO and oxygen into the reactor to supply the liquid water with dissolved CO and oxygen,
   wherein the catalytic system catalyzes the removal of CO by a reaction of CO with liquid water.

2. The catalytic system of claim 1, wherein the co-catalyst is a copper (Cu)-based compound with a redox potential, an iron (Fe)-based compound with a redox potential, a vanadium (V)-based compound with a redox potential, a heteropolyacid, or a mixture thereof.

3. The catalytic system of claim 2, wherein the copper-based compound with the redox potential is $CuCl_2$.

4. The catalytic system of claim 1, wherein the temperature of the catalytic system is from 15 to 95° C.

5. The catalytic system of claim 1, wherein the temperature of the catalytic system is from 60 to 80° C.

6. The catalytic system of claim 1, wherein the support is a carbon carrier, alumina, silica, zeolite, $TiO_2$, $ZrO_2$, $CeO_2$, $Fe_2O_3$, or a mixture thereof.

7. The catalytic system of claim 1, wherein the gold catalyst is loaded on a hydrophilic support and wherein the hydrophilic support is immersed in the aqueous phase.

8. The catalytic system of claim 2, wherein the iron-based compound with the redox potential is $FeCl_3$.

9. The catalytic system of claim 2, wherein the vanadium-based compound with the redox potential is $V_2O_5$.

10. The catalytic system of claim 2, wherein the heteropolyacid is at least one selected from the group consisting of $H_3PMo_{12}O_{40}$, $H_4PVMo_{11}O_{40}$, $H_5PV_2Mo_{10}O_{40}$, $H_6PV_3Mo_9O_{40}$, $H_4SiMo_{12}O_{40}$, $H_5SiVMo_{11}O_{40}$, $H_6SiV_2Mo_{10}O_{40}$, $H_7SiV_3Mo_9O_{40}$, $H_3PW_{12}O_{40}$, $H_4PVW_{11}O_{40}$, $H_5PV_2W_{10}O_{40}$, and $H_6PV_3W_9O_{40}$.

11. A fuel processor comprising the catalytic system of claim 1.

12. The fuel processor of claim 11, wherein the catalytic system is packed in a fixed bed.

13. The fuel processor of claim 11, wherein the fuel processor further comprises a desulfurizer and a fuel reformer.

14. A fuel cell system comprising the catalytic system of claim 1 and at least one fuel cell.

* * * * *